United States Patent [19]
Ball

[11] 3,913,624
[45] Oct. 21, 1975

[54] FLEXIBLE REINFORCING STRUCTURES

[75] Inventor: Eric Ball, Newcastle-upon-Tyne, England

[73] Assignee: Dunlop Limited, London, England

[22] Filed: Apr. 14, 1972

[21] Appl. No.: 244,055

[30] Foreign Application Priority Data
Apr. 21, 1971 United Kingdom............ 10342/71

[52] U.S. Cl.................................. 138/132; 138/137
[51] Int. Cl.[2] ......................................... F16L 11/08
[58] Field of Search .......... 138/118, 129, 130, 132, 138/133, 137, 140, 141, 153, DIG. 2, DIG. 7

[56] References Cited
UNITED STATES PATENTS

| | | | |
|---|---|---|---|
| 2,135,057 | 11/1938 | Slayter et al. | 138/DIG. 2 |
| 2,467,999 | 4/1949 | Stephens | 138/DIG. 2 |
| 2,653,887 | 9/1953 | Slayter | 138/DIG. 2 |
| 2,723,705 | 11/1955 | Collins | 138/DIG. 2 |
| 2,969,812 | 1/1961 | Ganahl | 138/138 |
| 2,991,808 | 7/1961 | Siegmann et al. | 138/137 |
| 3,013,921 | 12/1961 | Jacobson | 138/129 |
| 3,080,893 | 3/1963 | Craycraft | 138/141 |
| 3,357,456 | 12/1967 | Grawey et al. | 138/130 |
| 3,481,369 | 12/1969 | De Ganahl | 138/153 |
| 3,500,867 | 3/1970 | Elson | 138/132 |
| 3,528,457 | 9/1970 | Martin et al. | 138/132 |
| 3,578,029 | 5/1971 | Cullen et al. | 138/133 |
| 3,676,246 | 7/1972 | Grosh | 138/141 |
| 3,698,988 | 10/1972 | Skobel | 138/129 |

*Primary Examiner*—Herbert Goldstein
*Attorney, Agent, or Firm*—Stevens, Davis, Miller & Mosher

[57] ABSTRACT

A flexible reinforcing structure comprising a layer of non-woven matrix supporting material, an adjacent layer of flattened non-folded non-woven filamentary material, and a flexible binding layer of polymeric material securing together the non-woven matrix supporting material and the non-folded filamentary layer.

11 Claims, 4 Drawing Figures

FLEXIBLE REINFORCING STRUCTURES

This invention relates to the manufacture of flexible reinforcing structures and in particular, though not exclusively, to flexible reinforcing structures for use as reinforcement in flexible articles, such as flexible hose. The hose may be for suction, high or low pressure or hydraulic industrial or marine applications.

In the specification of our co-pending cognate U.S. Pat. application No. 108,728 there is described a flexible hose made from a tube of polymeric material having an embedded reinforcement layer in the form of a layer of cords and at least one layer of non-woven matrix material for supporting the reinforcement members and to stiffen the hose.

One object of the present invention is to provide an improved flexible reinforcing structure and an improved flexible reinforcing strip.

Another object of the present invention is to provide an improved reinforced flexible article and an improved method of manufacture of reinforced flexible articles, e.g. flexible hose.

According to one aspect of the present invention a flexible reinforcing structure comprises a layer of non-woven matrix supporting material, an adjacent layer of flattened non-folded non-woven filamentary material, and a flexible binding layer of polymeric material securing together the non-woven matrix supporting material and the non-folded filamentary layer.

According to another aspect of the present invention the flexible reinforcing structure defined in the preceding paragraph is in the form of a strip and the filamentary material is arranged to extend parallel or substantially parallel to the length of the strip.

According to a further aspect of the present invention a method of manufacture of flexible articles comprises forming an inner lining of elastomeric material, applying around the inner lining a layer of non-woven matrix supporting material, an adjacent layer of flattened non-folded non-woven filamentary material and a flexible binding layer of polymeric material to secure together the non-woven matrix supporting material and the non-folded filamentary material, and vulcanizing the assembly so formed.

The invention also provides a flexible article having a reinforcement layer formed by a flexible reinforcement structure built from a flexible reinforcement strip as defined in the preceding paragraphs.

The flexible article may be a flexible hose.

Preferably, the non-woven matrix supporting material is made from CEREX material (a Monsanto product) which comprises a web of randomly-disposed fine filaments of nylon welded together at their cross-over points by a hydrochloric acid process.

Alternatively, the non-woven matrix supporting material may comprise other filaments or fibres of synthetic textile materials (e.g. polyamides, polyesters, polypropylene, rayon etc), metal wires, glass fibres or filaments, and the matrix may be assembled by means other than welding the cross-over points. For example, the material of the matrix may be secured together by the material impregnating the layer which may be a rubber latex which may be applied by means of a latex applicator unit and then dried by heating. Other elastomeric material or other polymeric material such as a thermosetting plastics material may be used. The material may or may not be vulcanizable, and the covering of latex or other material may be very thin compared with the thickness of the matrix.

In an alternative arrangement the matrix material is of paper. In this case the paper needs to be absorbant and porous to the impregnating material so that it will act in a similar manner to the porous matrix described above.

Preferably, non-folded non-woven filamentary material comprises a yarn of nylon filaments or other synthetic filaments, e.g. polyesters, polypropylene.

Alternatively, other textile non-folded materials may be utilized. For example, rayon or a group of non-folded fine steel wires may be utilized, the fine wires each having a diameter of 0.003 thousandths of an inch or less. Moreover, glass fibre filaments may be used.

In addition to the non-folded filamentary material layer of yarns or filaments referred to, the layer may be of yarns made from rolled or folded strip, from slit film or fibrillated film. Moreover, sheet, strip or film members may be used of appropriate thickness and size to retain a flat reinforcement and to result in a cohesive final product.

By non-folded is meant an assembly of filaments which are not tightly twisted together. They may be bereft of twist or may have a nominal twist such as is provided by manufacturers solely to keep the filaments together in the form of discrete yarns and to assist in handling and transport. Some "non-folded" yarn is supplied by manufacturers with a twist of about 0.5 turns per inch and some is supplied with a "false twist" wherein the individual filaments are tangled together. Preferably, the filaments are substantially bereft of twist but there may, for example, be a twist of two turns per inch for satisfactory operation of the invention.

Preferably, the binding layer of polymeric material comprises a vulcanizable natural or synthetic rubber of a latex material or a thermoplastic material such as polyvinylchloride. It is not essential that the binding layer shall bond to individual filaments either of the matrix layer or of the non-folded filamentary layer.

Flexible reinforcing strip in accordance with the present invention may be used in the construction of hose reinforcements by what is known as the "Gacord" process, described in the specification of our U.K. Pat. No. 1,033,547 and U.S. Pat. No. 3,428,507 or may be used for wrapping longitudinally onto a mandrel on which a hose is built or in any other way so as to construct a hose reinforcement.

The invention will now be described, by way of example, with reference to the manufacture of flexible hose, to bring out the many advantages that can be obtained by its use.

Reference is made to the accompanying drawings in which.

Several hose constructions are described in the specification of our co-pending cognate U.S. Pat. application No. 108,728 and these hose constructions all can be modified by means of the present invention.

Figure 1:
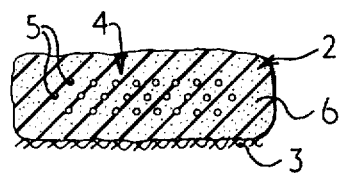
FIG. 1 is a cross-sectional view of a flexible reinforcing strip in accordance with the present invention.
Figure 3:
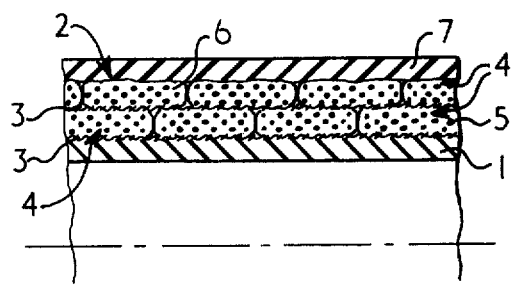
FIG. 3 is a cross-sectional view of part of a hose incorporating the flexible reinforcing strip shown in FIG. 1.

In one embodiment of the invention a hose of this kind is modified, as illustrated in FIG. 3, by the use of a flexible reinforcing strip in accordance with the present invention and illustrated in FIG. 1. An inner liner 1 is formed from an extruded rubber tube. A flexible reinforcing structure comprising two layers of reinforcement, is wound spirally in the form of strips 2. Each strip comprises a non-woven matrix supporting material 3, and a group 4 of flattened non-folded nonwoven nylon filaments 5 in the form of a yarn which extend parallel to the length of the strip; the non-woven matrix 3 and the filaments 5 are embedded in rubber latex 6. An outer cover layer 7 is formed by extrusion of rubber around the reinforcement layers.

In the construction illustrated the nylon yarn is in the form of singles, i.e. non-folded non-woven filaments of 1,000 denier at 32 ends per inch. The nylon yarn may, alternatively, be a four-fold 1,000 denier yarn at 8 ends per inch.

Figure 2:
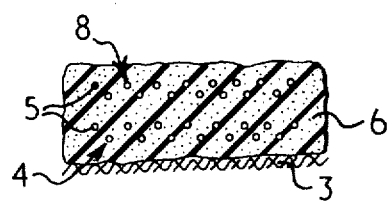
FIG. 2 is a cross-sectional view of an alternative flexible reinforcing strip in accordance with the present invention.

A modified form of the reinforcement strip just described is illustrated in FIG. 2 of the accompanying drawings.

The modification comprises a second similar layer 8 of "singles" flattened non-folded nylon yarn multifilament material superimposed upon the first layer 4, no additional layer of non-woven matrix supporting material being required.

Figure 4:
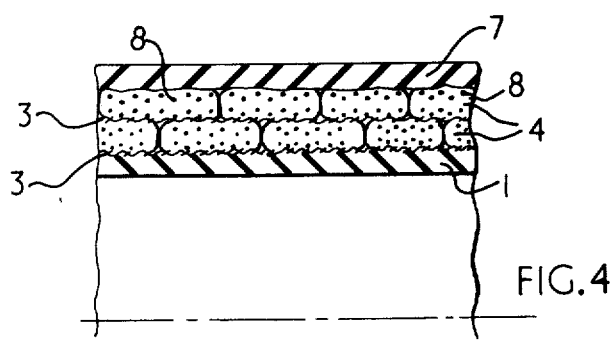
FIG. 4 is a cross-sectional view of part of a hose incorporating the alternative flexible reinforcing strip shown in FIG. 2.

A hose incorporating two reinforcement layers, each formed from reinforcing strip of this kind, is shown in FIG. 4.

Hose manufactured with a reinforcement of the kind described has the following advantages, some of which are additional to those which are obtained from the previously-mentioned constructions described in our cognate U.S. patent applications.

The hose is cheaper to manufacture than hoses incorporating normal woven fabric on account of the relative cheapness of the matrix material. Upon vulcanization, shrinkage of the reinforcement material at vulcanization temperatures, which normally causes "cheese cutting" of the rubber of the inner liner of the hose, does not take place and shrinkage is further resisted by the use of the flattened non-folded yarns, supported by the matrix material, compared with the folded reinforcement material described in the above-mentioned cognate applications, by virtue of the flattening of the non-folded yarns which takes place (see drawings), which spread across the matrix so that the shrinkage is resisted over a greater area of the matrix. Thus, a filament subject to an 8% shrinkage when used in conventional constructions can be utilized without a cheesecutting effect upon the liner which consequently can be comparatively thin yet still retain a substantially smooth bore unaffected by shrinkage distortion.

It will be appreciated that yarn doubling costs are obviated, that the matrix and reinforcing nonfolded flattened material is thinner than the strip utilizing doubled yarns and is also of more uniform thickness. This enables the overlapping of subsequent turns of the strip material when they are wound upon an inner liner supported by a mandrel without a bulky and uneven hose being produced, it being appreciated that the lap joint provides an extremely strong form of construction. Multiple layers of strip according to the invention provide strength and at the same time a thin-walled hose.

Hoses, with one or more layers, are sufficiently thin and flexible that they can be flattened and rolled for storage and easy transport, transportation also being facilitated by the lightness of the structure.

A further advantage of the flattened strip is that it is more stable and handleable than the folded reinforced strip so that it will coil better on reels utilized on hosemaking machines which apply a spiral wrapping of strip onto an inner liner in the construction of reinforced hose.

As regards the penetration of polymeric material into the non-folded reinforcing yarns this can take place more easily than in the instance where the yarns are folded, the purely nominal twist applied to the flattened yarns promoting an easy flow around filaments of polymeric material forming part of the body of a hose construction.

The straight filaments of the flattened non-folded structure have higher tensile strength when included in the yarn than if the filaments were to be folded on account of their substantially linear form aligned with the yarn length compared with the spiral disposition of folded filaments.

While the present invention has been described specifically in relation to the manufacture of flexible reinforced hose it will be appreciated that a flexible reinforcing structure or strip may be utilised in the manufacture of various other flexible reinforced articles such as, for example, conveyor belting.

Having now described my invention, what I claim is:

1. A flexible hose comprising:
   a. an inner lining of polymeric material;
   b. a flexible binding layer of polymeric material in strip form around the inner lining and having embedded therein an untwisted and non-woven plurality of reinforcement filaments extending longitudinally in the direction of the length of the strip and substantially parallel to the longitudinal axis of the strip, said plurality of filaments comprising a flattened group of filaments;
   c. a support membrane of non-woven open structured randomly arranged filaments between the inner lining and the flexible binding layer of polymeric material, said membrane having no substantial reinforcing strength but serving only to support the flexible binding layer of polymeric material and to prevent cheese cutting of the inner lining by the strip on change in relative radial dimensions of the inner lining and strip;
   d. said reinforcement filaments being located substantially directly on the non-woven support membrane.

2. A flexible hose according to claim 1 wherein the untwisted and non-woven reinforcement filaments are formed from synthetic material.

3. A flexible hose according to claim 2 wherein the reinforcement filaments are formed from a yarn of synthetic material.

4. A flexible hose according to claim 1 wherein the reinforcement filaments comprise yarns rolled or folded material.

5. A flexible hose according to claim 1 wherein the reinforcement filaments are formed from slit film.

6. A flexible hose according to claim 1 wherein the reinforcement filaments are formed from fibrillated film.

7. A flexible hose according to claim 1 wherein the reinforcement filaments comprise non-folded fine steel wires.

8. A flexible hose according to claim 1 wherein the reinforcement filaments are in the form of filaments of glass fibers.

9. A flexible hose according to claim 1 wherein the non-woven support membrane is impregnated with polymeric material.

10. A flexible hose according to claim 1 wherein the randomly arranged filaments comprise a matrix and are interconnected at their cross-over points.

11. A flexible hose according to claim 1 wherein the flexible binding layer is spirally wound around the inner lining.

* * * * *